Dec. 28, 1948.　　　L. C. HESTER　　　2,457,151
DISK PLOW
Filed April 19, 1945　　　2 Sheets-Sheet 1
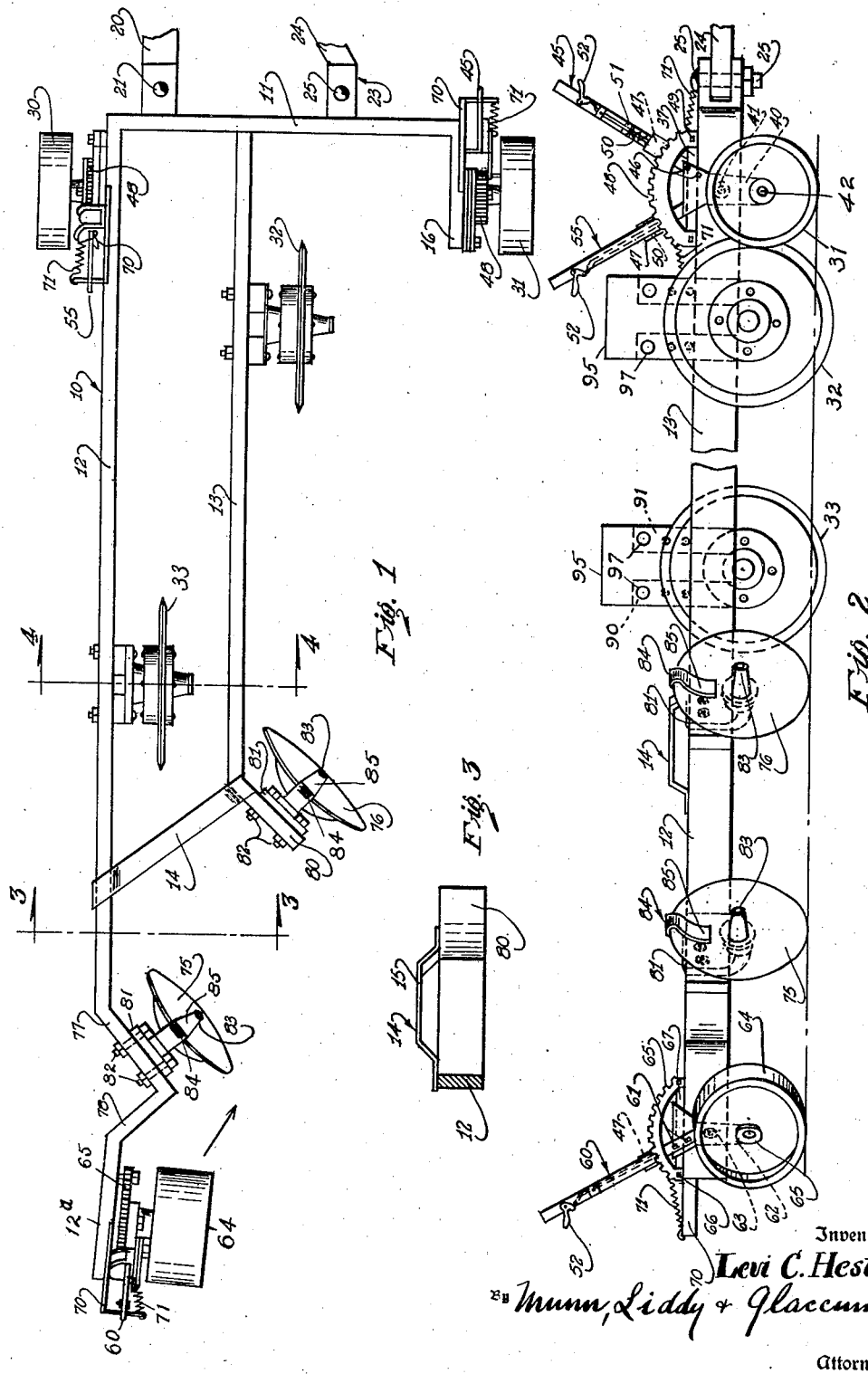
Inventor
Levi C. Hester
By Munn, Liddy & Glaccum
Attorneys

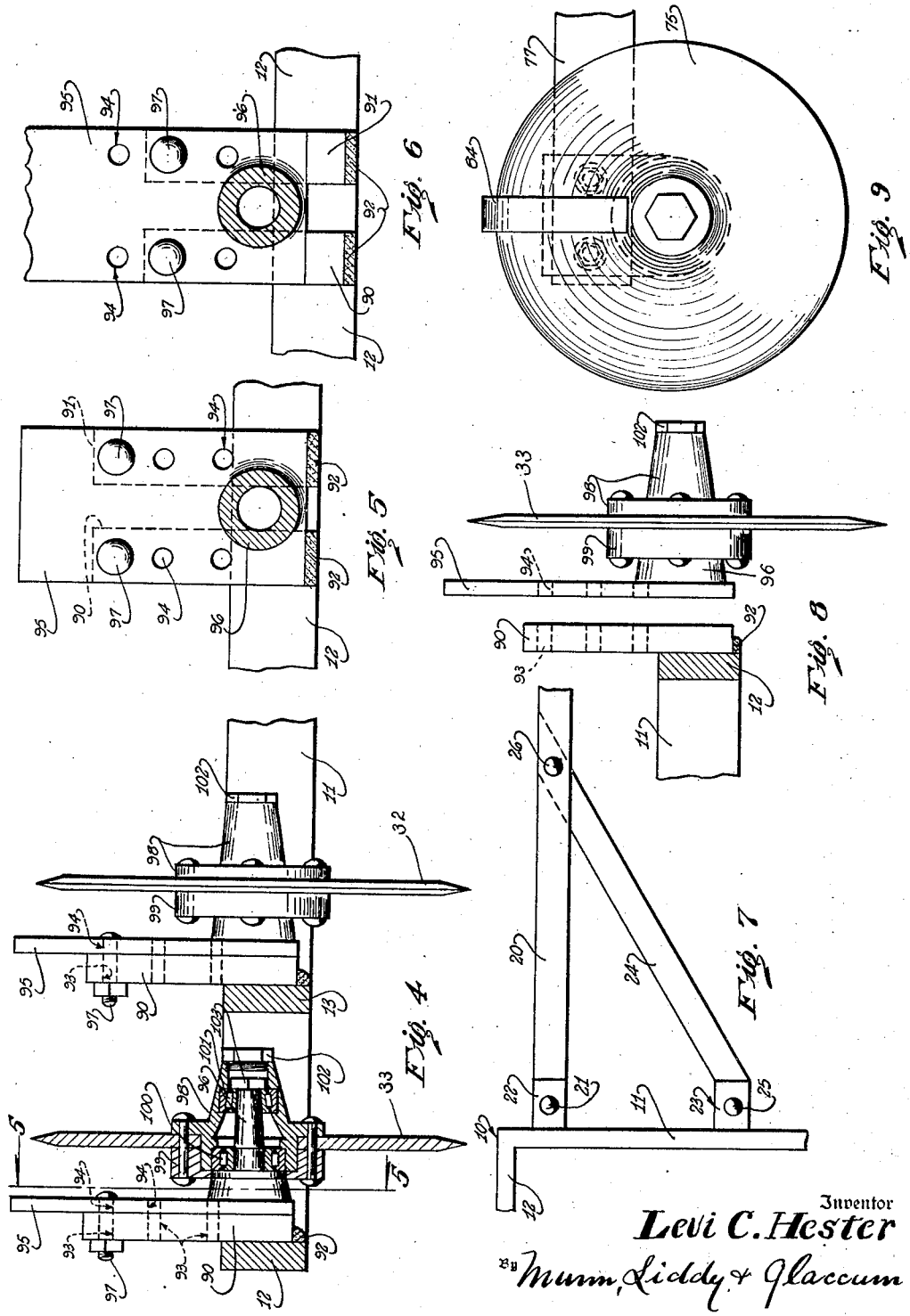

Patented Dec. 28, 1948

2,457,151

UNITED STATES PATENT OFFICE 2,457,151

DISK PLOW

Levi Cummings Hester, Jacksonville, Fla.

Application April 19, 1945, Serial No. 589,185

1 Claim. (Cl. 97—53)

This invention relates to improvements in disc plows.

It has been proposed to employ coulters in connection with mold board plows, but in practical operation it has been found that such plows readily clog when operating in fairly dense vegetation. It is therefore necessary to stop the plows and remove the clogged vegetation before plowing can be continued.

It is an object of the present invention to so construct a plow in which coulters are employed for cutting any type of soil so that the soil with dense vegetation may be turned over by succeeding rotating discs disposed at an angle to the direction of travel of the plow.

Another object of the invention is the provision of a disc plow having a frame which includes a pair of longitudinally disposed parallel bars on which are mounted vertical coulters for cutting the soil to a predetermined depth with discs in rear of each coulter located at an angle thereto for turning over the soil, said frame being supported by a pair of wheels at the forward end and a single guide wheel at the rear which is set at such an angle that it resists the lateral thrust imparted by the discs and will constantly direct the plow in a straight line.

This invention will be best understood from a consideration of the following detailed description, in view of the accompanying drawings forming a part of the specifications; nevertheless, it is to be understood that the invention is not confined to the disclosure, being susceptible of such changes and modifications as define no material departure from the salient features of the invention as expressed in the appended claim.

In the drawings:

Fig. 1 is a plan view of a plow constructed according to the principles of my invention.

Fig. 2 is a side view of the same.

Fig. 3 is a transverse vertical section taken along the line 3—3 of Fig. 1.

Fig. 4 is a transverse vertical section taken along the line 4—4 of Fig. 1.

Fig. 5 is a vertical section taken along the line 5—5 of Fig. 4.

Fig. 6 is a similar section showing the adjustment for the spindle of a coulter.

Fig. 7 is a fragmentary plan view showing the hitch between a tractor and a plow.

Fig. 8 is a side view in elevation of the bearing supports for a coulter with the parts separated.

Fig. 9 is an enlarged front view of a coulter plow.

Similar reference characters in the several figures indicate similar parts.

In carrying out my invention I provide a plow having a frame upon which is rotatably mounted pairs of coulters or flat discs and pairs of coulter plows or dish shaped discs, the separate members of the respective pairs being disposed in staggered relation rearwardly from the front of the machine which is carried at its forward end by supporting wheels and at its rear by a single guide wheel operating at all times to maintain the plow along the furrows in line with the direction of drag, said frame being adjustable on the wheels so that it may be maintained in a level position and the depth of the furrows regulated as desired.

Referring more particularly to the drawings 10 generally designates a frame which is composed of a front bar 11 to which is connected the forward ends of a pair of parallel longitudinal bars 12 and 13. It will be noted that the bar 12 is longer than the bar 13 for a purpose which will be presently explained.

A brace bar 14 is connected at its ends to the rear end of the bar 13 and to an intermediate portion of the bar 12. This brace bar as shown in Fig. 3 is U-shaped as shown at 15. In other words, the intermediate portion of the brace bar 14 is raised to permit vegetation to pass under the same.

A short bar 16 extends rearwardly from one end of the front bar 11. Bars 12, 13 and 16 may be welded or secured in any approved manner to the front bar 11.

A hitch bar 20 is pivotally mounted at 21 in a U-shape member 22 which is welded to the front face of the bar 11. A second U-shape member 23 is also welded to the front face of the bar 11 in spaced relation with the U-shape member 22. A link 24 has one end pivoted at 25 in the U-shape member 23 while the other end is pivoted or bolted at 26 to the hitch bar 20. The forward end of the bar 20 is adapted to be connected in any approved manner with a tractor so that the plow may be drawn forwardly or backed up when desired.

A pair of front wheels 30 and 31 are respectively supported by the forward end of the longitudinal bar 12 and by the short longitudinal bar 16. The connection between the wheels 30 and 31 with the respective bars 12 and 16 is such that the frame 10 may be raised or lowered if desired and one side of the frame may be raised or lowered independently of the other side. The wheel 30 may be termed a level wheel since the portion of the frame adjacent the wheel 30 must be raised or lowered to maintain the proper depth of cut of the coulters 32 and 35.

A plate 37 is welded to the bar 16 and a crank plate 40 is pivoted on a bolt 41 which is supported by the bar 16. A wheel 31 is rotatably mounted on an axle 42 which is carried by the lower end of the plate 40.

A lever 45 is rigidly secured at 46 to the upper end of the plate 40 and above its pivot 41. This lever is provided with a pawl 47 which engages teeth 48 of an arcuately shaped rack which is secured at 49 to the plate 37. The pawl 47 is of the usual type and is designed to be released from engagement with the teeth against the tension of a spring 50 mounted in a U-shape bracket 51 carried by the lever 45. Said lever is adapted to rock the crank plate 40 for raising the axle 42 of the wheel 31 with respect to the bar 16 while the pawl 47 holds the lever and crank plate in position. A hand lever 52 is pivotally mounted on the lever 45 and is adapted to withdraw the pawl 47 from its engagement with the teeth 48.

A lever 55 is adapted to raise or lower the wheel 30 and since all of the elements connected with the lever 55 are identical in construction with the elements associated with the lever 45 the same reference numerals are applied to such similar elements associated with the lever 55.

A lever 60 is secured at 61 to a crank plate 62 pivoted on a bolt 63 carried by the rear end of the longitudinal bar 12. A rear wheel 64 which has a broad flat face, as have the wheels 30 and 31, is rotatably mounted on an axle 65 secured to the lower end of the crank plate 62. A rack 65 is secured at 66 to a bar or plate 67 welded to the portion 64 of the bar 12. Since the pawl and associated elements are of identical construction as that shown in connection with the lever 45 the same reference numerals are employed.

A bracket 70 extends rearwardly from the portion 64 and a spring 71 has one end connected to the outer end of the bracket while the other end of the spring is connected to the lever 60. This spring tends to move the lever rearwardly when a hand lever 52 releases the pawl 47 from the teeth of the rack 65.

The levers 45, 55 and 60 are adapted to be operated for raising or lowering the respective wheels 31, 30 and 64 for maintaining the top of the frame 10 in a level position. This is particularly true during the plowing operation because the wheel 30 acts as a leveling wheel for the raising or lowering of the forward end of the frame adjacent the wheel 30. The rear wheel 64 will cooperate to maintain disc or coulter plows 75 and 76 at the proper depth and likewise the coulters 32 and 33.

Referring more particularly to Fig. 1 it will be seen that the coulter plow 75 is mounted on a bent portion 77 of the bar 12. A second bent portion 78 forms a connection between the angularly bent portion 77 and the extremity 12a of bar 12.

It will also be noted that the end portion 12a is inclined at a slight angle to the longitudinal bar 12 so that the vertical plane passing through the center of the rear wheel 64 will likewise be at a slight angle to a vertical plane passing longitudinally through the bar 12. The slight angular disposition of the wheel 64 with respect to the vertical plane passing through the longitudinal bar 12 tends to cause the wheel to travel in the direction indicated by the arrow in Fig. 1 and away from the side of the line cut by the coulter 33 which determines the side wall of the furrow. When the coulter plows 75 and 76 are moved through the soil for turning it laterally the pressure exerted on the coulter plows will tend to swing the rear end of the plow toward the left. However, the wheel 64 will counteract this tendency and maintain the plow at all times in a straight line along the furrow. The angular disposition of the wheel 64 thus prevents the wheel from riding up over the top of the furrow during the forward travel of the plow.

The bar 13 has a bent extension 80 turned at an angle to the bar and in parallel relation with the bent portion 77 of the bar 12. A plate 81 is bolted at 82 to the bent extension 80 and is provided with an axle 83 upon which is mounted the coulter plow 76.

A combined guard and scraper 84 is secured to the plate 81 and extends upwardly and is then curved downwardly over the upper edge of the coulter plow 76 and bent inwardly as shown at 85. The coulter plow 76 is not only inclined at an angle to the line of travel of the plow but is likewise inclined vertically. The coulter plow 75 is connected to the bent extension 77 in the same manner as is the plow 76 to the extension 80 so that the same reference numerals will be employed in connection with the identical parts.

Since the coulters 32 and 33 have identically the same elements cooperating to adjustably position the said coulters on the respective bars 12 and 13 the same reference numerals will be employed for said elements. The coulters 32 and 33 have a mounting which is adjustable on the respective bars 12 and 13 and this adjustable mounting is shown more particularly in Figs. 4 to 6 inclusive and Fig. 8. A pair of bars 90 and 91 are welded to the bar 12 as shown at 92. These bars are vertically disposed and spaced from each other with the top ends of the bars being slightly below the lower edge of the longitudinal bar 12. These bars are provided with a plurality of passages 93 which are adapted to be alined with passages 94 in a plate 95 that carries an axle 96. The inner end of the axle is welded or secured in any approved manner to the plate 95. Bolts 97 are adapted to be inserted through pairs of the alined passages in the plate 95 and the bars 90 and 91 for adjustably positioning the plate 95 and likewise the axle 96.

A housing 98 is riveted to a casing 99 and the rivets as shown in Fig. 4 pass through perforations in the coulter 33 so that the coulter is rigidly secured to the housing 98 and the casing 99. Bearings 100 and 101 are seated within the housing 98 and embrace the axle 96. The outer end of the housing 98 is closed by a cap screw 102. A nut 103 is threaded on the outer end of the axle 96 against the bearing 101 for maintaining the coulter 33 rotatably supported on the axle 96.

The coulter 32 has identically the same supporting structure and therefore the same reference numerals which are used in the supporting elements of the coulter 33 are applied to the identical parts associated with the coulter 33.

A comparison of Figs. 5 and 6 will show the adjustment of the plate 95 on the bars 90 and 91 for raising or lowering the coulter as is necessary.

During the plowing operation the plow is drawn over the surface by a tractor connected with the hitch bar 20. The brace bar 24 cooperates with the bar 20 for maintaining the frame 10 always in a line with the direction of the travel of the tractor.

In this connection it may be pointed out that the rear wheel also cooperates with the particular construction of the hitch bar for maintaining the proper line of travel of the plow. In standard plows when an obstruction is met it is necessary to turn the plow to one side and pull it around the field to the point where the obstruction is met and to one side of the same. However, with the present construction the plow can be backed up due to the fact that the hitch bar 20 and the brace bar 24 will permit the tractor to be reversed for backing the plow off of the obstruction.

The plow described herein is particularly efficient in plowing land which is covered with dense vegetation because the proper depth of the cutting of the coulters 32 and 33 is maintained at all times so that the coulter plows will be able to turn over the earth together with the dense vegetation. Furthermore, the broad flat faced wheels will permit the plow to be drawn over soft earth or hard earth with equal facility.

I claim:

In a disc plow the combination with a frame comprising a forward cross piece having a short rearwardly extending wheel carrying arm at one end and a long rearwardly extending side rail at its other end, said side rail having a bent portion extending at an angle inwardly and a wheel bearing extremity projecting therebeyond and lying at an obtuse angle to the forward portion of the side rail, an intermediate rail attached to the cross piece parallel to the side rail and of shorter length than the latter and provided with an inwardly bent extremity, and a rearwardly extending arched bracing member connecting rear portions of the two rails, of disc plows mounted on the angularly bent portions of the two rails, coulters on the parallel portions of the rails, disposed one ahead of the other, supporting wheels on the forward end of the frame and a ground wheel carrying the rear end of the side rail behind the disc thereon and rotating in a plane to resist the lateral thrust of the plow created by said discs.

LEVI CUMMINGS HESTER.

REFERENCES CITED

The following references are of record in the file of this patent:

UNITED STATES PATENTS

| Number | Name | Date |
| --- | --- | --- |
| 603,136 | Gordon | Apr. 26, 1898 |
| 625,764 | Heylman | May 30, 1899 |
| 702,022 | Mecum | June 10, 1902 |
| 773,871 | Horner | Nov. 1, 1904 |
| 1,256,984 | Davis | Feb. 19, 1918 |
| 1,509,310 | Paul | Sept. 23, 1924 |
| 2,132,166 | Hester | Oct. 4, 1938 |